(12) United States Patent
Johnson

(10) Patent No.: US 8,011,734 B1
(45) Date of Patent: Sep. 6, 2011

(54) VARIABLE ROLLING RESISTANCE WHEEL FOR ROLLING VEHICLE

(76) Inventor: Lennart B Johnson, Milford, NH (US)

(*) Notice: Subject to any disclaimer, the term of this patent is extended or adjusted under 35 U.S.C. 154(b) by 239 days.

(21) Appl. No.: 12/469,815

(22) Filed: May 21, 2009

(51) Int. Cl.
*B60B 19/08* (2006.01)

(52) U.S. Cl. ............... 301/5.1; 301/64.303; 301/64.202; 301/64.305

(58) Field of Classification Search ............ 301/5.1, 301/5.301, 5.7, 5.302, 5.304, 5.306, 5.309, 301/64.706, 64.303, 64.305, 64.306, 63.102, 301/64.202, 64.203, 95.11; 280/11.19, 11.221, 280/11.223, 11.225, 11.227, 11.231, 11.233, 280/11.25; 482/63
See application file for complete search history.

(56) References Cited

U.S. PATENT DOCUMENTS

| | | | | |
|---|---|---|---|---|
| 4,898,403 A * | 2/1990 | Johnson | ........................ | 280/842 |
| 5,564,790 A * | 10/1996 | Lekavich | .................... | 301/5.306 |
| 5,658,053 A * | 8/1997 | Vencill et al. | ............... | 301/105.1 |
| 5,823,293 A * | 10/1998 | Gilbertson et al. | ............ | 184/5.1 |
| 6,000,762 A * | 12/1999 | Chang | ........................ | 301/64.303 |
| 6,131,923 A * | 10/2000 | Miotto | ...................... | 280/11.223 |
| 7,011,317 B1 * | 3/2006 | Hicks et al. | .............. | 280/33.991 |
| 7,090,306 B1 * | 8/2006 | Piper | .......................... | 301/5.307 |

* cited by examiner

*Primary Examiner* — Kip T Kotter
(74) *Attorney, Agent, or Firm* — Joseph E. Funk

(57) ABSTRACT

A wheel for an in-line skate or other wheeled vehicle is disclosed that may be modified to alter the rolling resistance of the wheel. The wheel may be disassembled to change a tire on the outer surface of the wheel to one made of a harder or softer material, and to insert or change a grease of a chosen viscosity into a chamber inside the wheel. The two changes may be utilized singly or collectively to help set the rolling resistance of the wheel. The wheel may be retrofit onto existing in-line roller skates.

13 Claims, 3 Drawing Sheets

VARIABLE ROLLING RESISTANCE WHEEL FOR ROLLING VEHICLE

FIELD OF THE INVENTION

The present invention relates to a wheel providing variable rolling resistance to a wheeled vehicle. More particularly, the present invention relates to an adjustable wheel for varying the amount of rolling resistance of a roller ski or an in-line skate.

BACKGROUND OF THE INVENTION

Roller skis are used for ski training in the off season when there is no snow. Such training must simulate skiing on wet snow and on dry, powdery snow. Roller skis are also used by many non skiers for a low impact aerobic exercise. In order to duplicate the energy expenditure of snow skiing it is desirable to have relatively slow wheels on such roller skis. The rolling speed is mainly a function of the energy return of the tire material on the wheels. Tires made with low rebound, high energy absorbing materials offer more rolling resistance but they can become extremely hot and often fail prematurely. In such cases entire wheels must be replaced, all too frequently. Conversely, tires made with high rebound, low energy absorbing materials offer little rolling resistance but these wheels roll too fast and do not properly simulate skiing on snow. In order to duplicate the energy expenditure of snow skiing it is desirable to have slow wheels without having the heating problems normally associated therewith.

As the popularity of in-line skating grows, more and more people are using in-line skates for purposes other than purely recreational skating. Several different categories of skaters and skates have evolved. For example, there are aggressive skates, speed skates, hockey skates, and many levels of recreational and fitness skates. Those people familiar with in-line skating often transition from recreational skating to fitness skating as they become more experienced therewith.

Many experienced fitness and speed skaters use their in-line roller skates for conditioning and endurance training. However, because the wheels and bearings of in-line skates offer little or no resistance, skaters must travel at very high speeds to achieve a desired heart rate and muscular conditioning. Many skaters do not wish to travel at the high speeds required for such training. Further, it is often difficult to safely travel at high speeds when skating on a busy bicycle path or street.

Thus, there is a need for means to vary the rolling resistance of one or more of the wheels used on roller skis to simulate skiing on different types of snow, such as wet snow or powdery snow, or on in-line roller skates to accommodate different exercise routines.

SUMMARY OF THE INVENTION

A novel wheel for wheeled vehicles such as roller skies and in line skates is taught that comprises a wheel that may be modified to adjust the rolling resistance thereof to meet individual requirements. In that way roller skis equipped with the novel wheels and used for ski training in the off season can properly simulate skiing on different types of snow. In line skates equipped with the novel wheels may simulate different competition and training conditions. In addition, by changing the wheels in line skates used for competition may also be used for training. This is particularly beneficial when skates are custom made to accommodate physical peculiarities or problems of a skater's feet, such as falling arches. A skater does not have to invest in two or more pairs of custom in line skates to accommodate competition and different training routines.

A skier in training during the off season may replace the standard wheels on their roller skis with the new adjustable wheel. The skier may modify their new adjustable wheels to simulate skiing on different types of snow, such as wet snow or powdery snow, or they may have a plurality of sets of the new adjustable wheels, each set modified to simulate skiing on different types of snow. The skier would then just change between their sets of adjustable wheels for the snow conditions they want to simulate.

Similarly, an in line roller skate skater may replace the standard wheels on their in line skates with the new adjustable wheel. A fitness skater can adjust the rolling resistance of the adjustable wheels on their in line skates to provide variable degrees of resistance so that the skater can achieve different levels of elevated heart rate and improved muscular conditioning without having to travel at high speeds. They can also adjust the rolling resistance of the wheels to decrease the rolling resistance to its minimum for competition skating. Alternatively, the skater may have a plurality of sets of the new adjustable wheels, each set modified to simulate different competition, training or exercise routines, and they change sets of wheels depending on what conditions they want to simulate, The rolling resistance of the novel wheel is varied in two different ways. First, the rolling resistance of a wheel is varied by using grease of different viscosities to change the kinematic shear action of the grease. Very simply stated this creates a "drag" effect on a rolling wheel. The grease is held in a closed, sealed area inside the rim of each wheel in contact with the shaft on which the wheel rotates. Second, the outer edge of the rim of each wheel has a replaceable "tire". Different "tire" materials affect the rolling resistance of a wheel. Tires made of soft rubbery materials have more rolling resistance than tires made of hard materials. The "tire" may easily be changed. By changing the tire of a wheel the rolling resistance of the wheel may thereby be changed.

The variable rolling resistance wheels of the present invention may be used to replace existing wheels on roller skis and on in line roller skates. For in line skates a new pair of skates need not be purchased for different applications such as training and competition. In addition, a skier or skater may have multiple sets of variable rolling resistance wheels in which they have inserted greases of selected viscosities, coupled with selecting "tires" of different materials to achieve a range of custom rolling resistances for the wheels of their roller skis or inline roller skates.

DESCRIPTION OF THE DRAWING

The invention will be better understood upon reading the following Detailed Description in conjunction with the drawing in which.

DETAILED DESCRIPTION

On a typical roller ski or in line roller skate two or more wheels with shaft or ball bearings are rotatably mounted on axles attached to the ski or skate. Other features of such roller skis or inline roller skates are well known in the art and are not discussed further herein.

The present invention is a novel, adjustable wheel that may used to replace the existing wheels on existing roller skis or in line roller skates, and the novel wheels may be manually and easily modified to change the rolling resistance of the wheels. Briefly, this is accomplished by changing a viscous grease on the inside of the wheel and in contact with a shaft on which the wheel turns and/or by changing a "tire" on the outer edge of a wheel.

There are a number of distinct advantages offered by the present invention. A roller skier can realistically simulate skiing on different types of snow. In addition, a roller skier may have multiple sets of wheels in which they have inserted greases of selected viscosities, coupled with selecting "tires" of different materials in order to achieve a range of custom rolling resistances for the wheels which thereby provides the different simulations. To change snow condition simulations the skier merely changes the wheels on their roller skis.

An inline roller skater can achieve different levels of elevated heart rate for improved muscular conditioning. A skater can also adjust the rolling resistance of the wheels to decrease the rolling resistance to its minimum for competition skating. In addition, a pair of in line roller skates used for competition may also be used for training. This is particularly beneficial when skates are custom made to accommodate physical peculiarities or problems of a skater's feet. A skater does not have to invest in two or more pairs of custom in line roller skates to accommodate competition and different training routines. In addition, the in line roller skater may have multiple sets of wheels in which they have inserted greases of selected viscosities, coupled with selecting "tires" of different materials in order to achieve a range of custom rolling resistances for the wheels which thereby provides the different conditions they want to achieve.

Figures 1A, 1B, 1C:
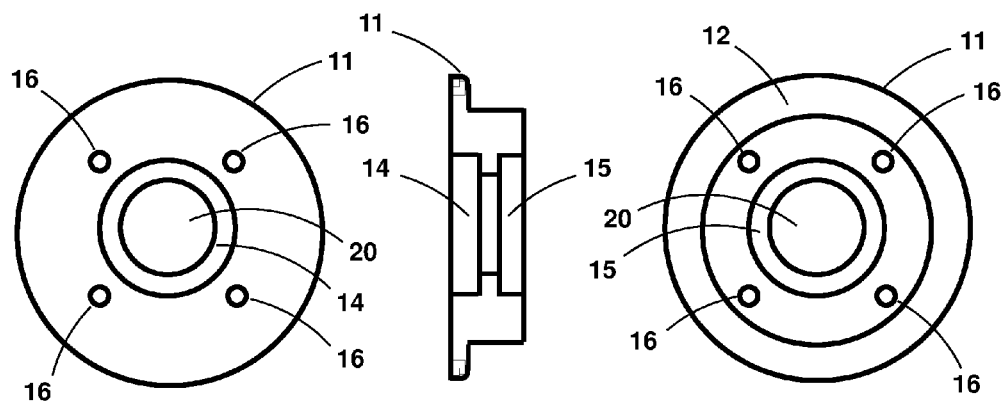
FIGS. 1a-c show three views of a wheel rim portion, two of which portions are assembled together to make a rim of the present invention.
Figure 2:
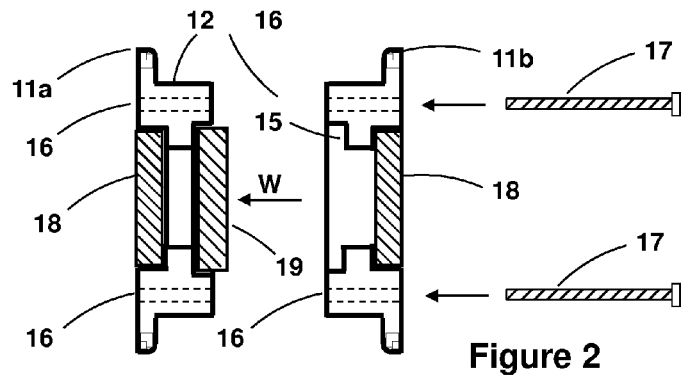
FIG. 2 is an exploded view showing how two of the wheel rim portions are to be assembled together with ball bearings and a new grease seal to make a rim on which a tire is mounted.
Figure 3:
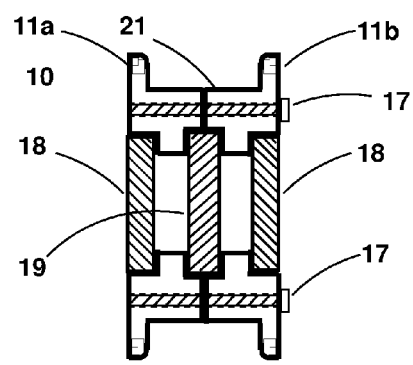
FIG. 3 shows two of the wheel rim portions assembled together with ball bearings and the new grease seal to make the new rim on which a tire is mounted.

In FIGS. 1A-1C is shown a portion 11 of the complete rim 10 of the novel wheel that is shown assembled in FIG. 3. FIG. 1A shows the outer surface of each rim portion 11, FIG. 1B shows an edge view of each portion 11, and FIG. 1C shows the inner surface of each rim portion 11. The assembled rim 10 shown in FIG. 3 is made up of two of these identical rim portions 11 as shown in FIG. 2. When two rim portions 11 of FIGS. 1A-1C are assembled together to make up a rim 10 the inner surfaces of two rim portions 11 contact each other as shown in FIG. 3.

Each rim portion 11 has four holes 16 there through as shown in FIGS. 1A and 1C through each of which a screw 17 is inserted to fasten two rim portions 11 together as shown in FIGS. 2 and 3. Although not shown in the figures for the sake of simplicity a hex head nut may be embedded into the outer surface over each of the four holes 16 through one of the two rim portions 11 and the screws 17 are inserted through the holes 16 of the other rim portion 11 to screw into the nuts. Alternatively, the hex head nuts may lie on the outer surface of the rim portion 11. Other non-permanent fastening arrangements may also be utilized.

Figure 5:
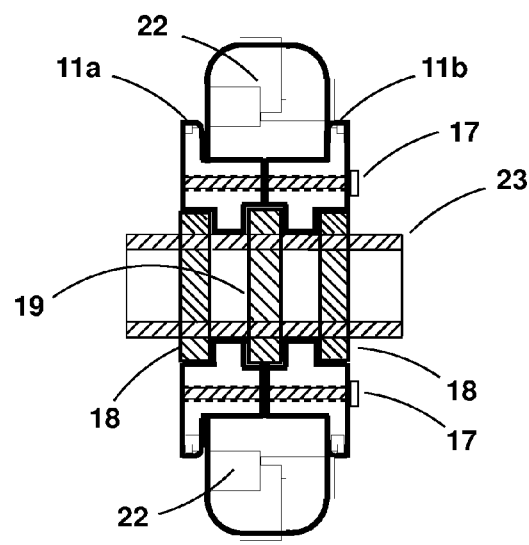
FIG. 5 shows two of the wheel rim portions and a tire are assembled together with ball bearings and the new grease seal to make a wheel in accordance with the teaching of the invention.

The outer surface of each rim portion 11, seen in FIG. 1A, has a recess 14 into which a ball bearing 18 is placed on assembly of a rim 10, as seen in FIGS. 2 and 3. The inner surface of each rim portion 11, as seen in FIG. 1C, has a recess 15 into which a grease seal 19 is placed on assembly of a rim 10 as shown in FIGS. 2 and 3. When two rim portions 11 are attached to each other as shown in FIG. 3, the two facing recesses 15 create a cavity into which the grease seal 19 is contained as shown in FIG. 3. The two rim portions 11 making up a complete rim 10 as shown in FIGS. 2 and 3 each have a rim extension 11a or 11b around their edge, as shown in FIGS. 2 and 3. When two rim portions 11 are fastened together as shown in FIG. 3 the two rim extensions 11a and 11b create a groove 21, as shown in FIG. 3, into which a user selected tire 22 is captivated as shown in FIG. 5.

The ball bearings used in wheels for roller skis and inline roller skates are typically 22 millimeter diameter ball bearings. In split rims used in the prior art there is one bearing in each rim half and the inner race of each bearing is separated by a spindle, so that when the wheel is mounted to wheel forks the pressure generated by the bolt and nut of the forks does not distort the bearing. If a wheel bolt is tightened without a spindle, the inner race of the bearing is forced out of alignment with the outer race resulting in rapid bearing failure. The possibility of such distortion is eliminated with the present invention by utilizing a hollow shaft 23 as shown in FIG. 5. An axle passes through the hollow shaft 23 and the bolts and nuts of the wheel forks is applied to hollow shaft 22, but never to the bearings 18.

FIG. 2 shows how two rim portions 11 are assembled (without a tire 22). A first rim portion 11 (shown on the left) has a ball bearing 18 friction fitted into its outer recess 14, and a grease seal 19 friction fitted into its inner recess 15, as shown is FIG. 2. A second rim portion 11 (shown on the right) then has a ball bearing 18 friction fitted into its outer recess 14. The two rim portions 11 are then pushed together as represented by arrow W with their screw holes 16 aligned with each other. The screws 17 are then inserted through the aligned screw holes 16 from the outer side of the right hand rim portion 11 and screwed firmly into a receiving nut (not shown) on the outer surface of the left hand rim portion 11. Only two screws 17 are shown in FIG. 2 for the sake of simplicity and to avoid cluttering the drawing.

A completely assembled rim 10 (without a tire 22) is shown in FIG. 3. Tire 22 is eliminated from FIG. 3 so as not clutter up the drawing and detract from the understanding of rim 10. Tire 22 is shown in and described with reference to FIGS. 4 and 5. When a user desires to initially configure the rolling resistance of a wheel 10, or to alter the rolling resistance of a previously configured wheel 10, the four screws 17 are removed, the two rim portions 11 are separated, a tire 22 may then be changed to alter the rolling resistance, and the grease seal 19 may be cleaned and a new grease inserted therein to further alter the rolling resistance.

Figure 4:
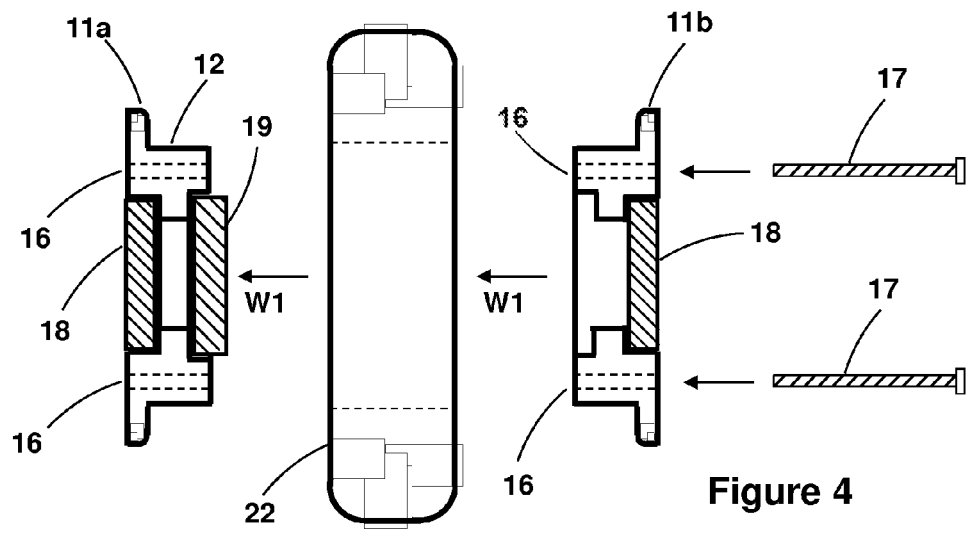
FIG. 4 is an exploded view showing how two of the wheel rim portions and a tire are to be assembled together with ball bearings and the new grease seal to make a variable rolling resistance wheel in accordance with the teaching of the invention.

FIG. 4 is alike FIG. 2 except a tire 22 is shown, which is the normal assembly of a wheel. First, the left hand rim portion has a ball bearing 18 friction fitted into its outer recess 14, and a grease seal 19 friction fitted into its inner recess 15. The right hand rim portion 11b then has a ball bearing 18 friction fitted into its outer recess 14. A tire 22 is then inserted onto ledge 12 of the left hand rim portion 11. The two rim portions are pushed together as represented by arrow W1 with their screw holes 16 aligned with each other. The screws 17 are then inserted through the aligned screw holes 16 from the outer side of right hand rim portion and screwed firmly into a receiving nut (not shown) on the outer surface of left hand rim portion 11a. Rim extensions 11a and 11b now comprise groove 21 (FIG. 3) and hold tire 22 therein as shown in FIG. 5. Only two screws 17 are shown in FIGS. 4 and 5 for the sake of simplicity.

FIG. 5 is alike FIG. 3, the two rim portions 11 are attached to each other, except tire 22 is retained in groove 20 (FIG. 3). Also shown is a hollow bushing 23 that is inserted through the holes 20 in each of rim portion 11 and through the two ball bearings 18 and grease seal 19 mounted therein. An axle of the in line skates (not shown) passes through hollow bushing 23. The purpose for having bushing 23 extend outside the assembled rim is as described in the following paragraph.

In split rims used in the prior art there is one ball bearing mounted in each rim half and the inner race of each bearing is separated by a spindle, so that when the wheel is mounted to wheel forks the pressure generated by the bolt and nut of the forks on the inner race of the bearings does not distort the bearing. If a wheel bolt is tightened without a spindle, the inner race of the bearing is forced out of alignment with the outer race resulting in rapid bearing failure. The possibility of such distortion is eliminated with the present invention by utilizing a bushing 23 as shown in FIG. 5. An axle passes through the hollow bushing 23 and the bolts and nuts of the wheel forks (not shown) in which wheel with bushing 23 are mounted is applied to bushing 23, but never to the inner race of bearings 18.

Bushing 23 is heat treated and polished to meet the specifications in diameter, hardness and surface roughness of the manufacturer of seal 19. Seal 19 meets the German DIN 3760 Type AS specification.

Figure 6:
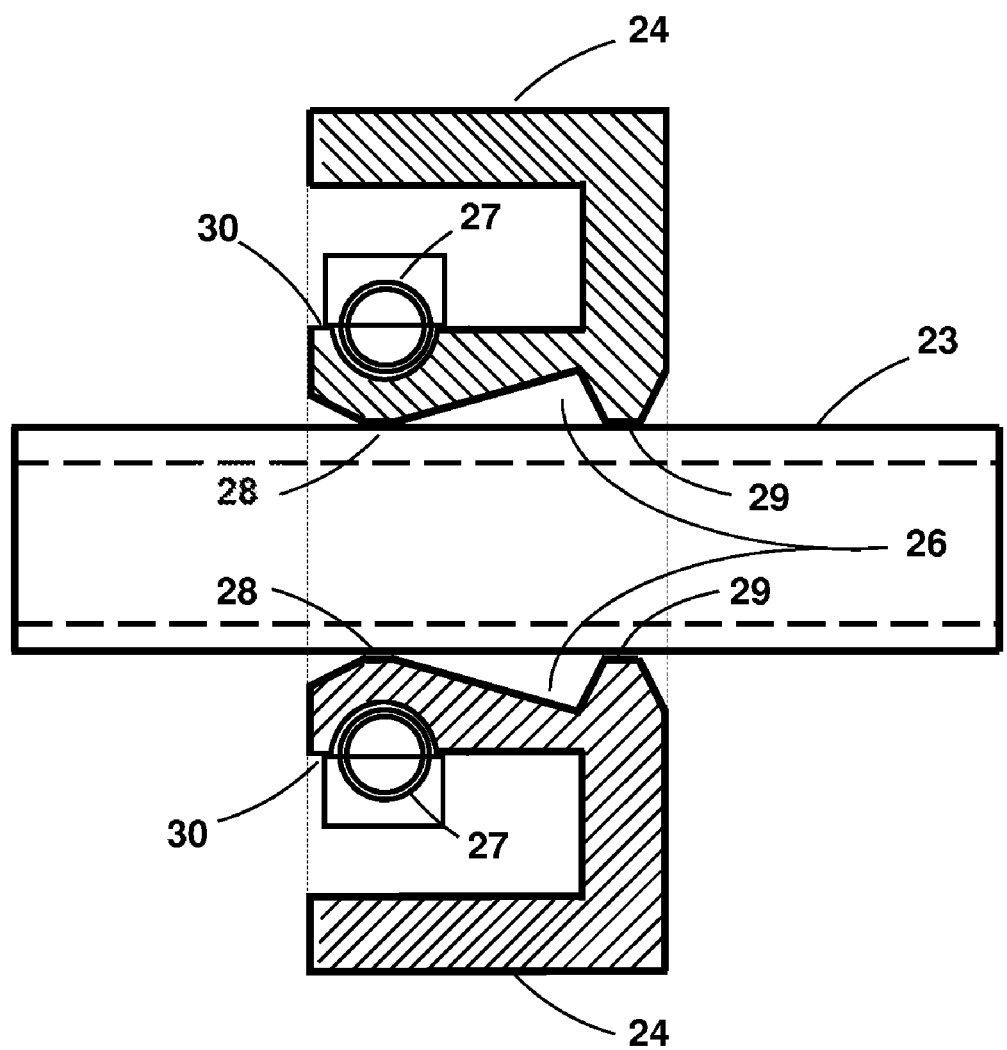
FIG. 6 is an exploded view of a grease seal on a shaft showing how grease of different viscosities is held against the shaft to affect the rolling resistance of the wheel in which the grease seal is located.

FIG. 6 is an enlarged cutaway view of radial grease seal 19 mounted on hollow bushing 23. Such radial seals are used for a variety of applications for both static and rotating shafts. In motors and gear boxes the seals prevent the lubricants from leaking. Radial seals come in a variety of types. DIN type radial seals have one or two elastomer wiping lips that contact a rotating shaft. Grease seal 19 is circular and has an outer wall 24 that is friction fit into the recess 15 in the center of the inner surface of each rim portion 11 as shown in FIGS. 4 and 5. There is a groove with a donut shaped garter spring 27 lying therein which applies pressure to the inner wall 30 of grease seal 19 which pushes ring shaped flat lips 28 and 29 into contact with the outer surface of bushing 23. On the opposite surface of inner wall 30 there are ring shaped flat lips 28 and 29 with a recess between them as shown. Lips 28 and 29 are termed the dust lip and the wiping lip. The shape of the recess is not important and may be different.

When grease seal 19 is placed on a shaft, such as bushing 23, there is an annular space 26 created between the recess and the outer wall of the bushing 23. Before grease seal 19 is assembled into a wheel 10 a silicon grease (not specifically shown) having a selected viscosity is packed into the recess that is part of space 26. By filling the recess between lips 28 and 29 with a high viscosity silicone lubricant the rolling resistance is increased not only by the friction of lips 28 and 29 of the radial seal, but also by the kinematic shear action of the fluid. In the preferred embodiment of the invention we are using a silicone fluid with 60,000 centistoke viscosity.

After grease seal 19 is mounted inside an assembled rim with a tire 22 thereon, as shown in other Figures, the bushing 23 of fully assembled wheel 10 is mounted on an axle of the in line roller skates. Bushing 23 is captivated by the wheel forks of the roller skis or in line roller skates and does not rotate.

As a wheel with its grease seal 19 rotates on bushing 23, the high viscosity of the silicone grease creates a "drag" effect called kinematic shear action which creates resistance to the turning of wheel 10. The more viscous the grease the more rolling resistance there is, and visa versa.

Thus, between selecting a tire 22 having more or less rolling resistance and selecting the viscosity of a grease that creates more or less rolling resistance, the rolling resistance of an assembled wheel may be manually determined. It has been found in testing that the increase in rolling resistance with one grease seal 19 ranges between 12 to 25% depending on the tire material used. Harder, high rebound, tire materials have a higher percentage increase in rolling resistance than softer, lower rebound, tire materials.

While what has been described herein is a preferred embodiment of the invention those skilled in the art will appreciate that numerous changes may be made without departing from the spirit and scope of the invention.

The invention claimed is:

1. A variable resistance wheel for a rolling vehicle, and the vehicle has one or more shafts for mounting wheels thereon, wherein the wheel comprises;
    a rim having a hole through its center for mounting the wheel on a shaft of the vehicle, the rim having at least one bearing that is mounted in the center mounting hole and the bearing permits the rim to rotate on the shaft;
    a tire mounted on the rim furthest from the hole through the center of the rim;
    a seal mounted in and concentric with the hole through the center of the rim and the shaft passes through the seal, the seal pressing against the shaft, and the seal has a recess that forms a chamber around the shaft when the seal is pressing against the shaft; and
    a viscous grease that is contained in the chamber and contacts the shaft;
    wherein the grease creates a kinematic shear action resistance to the rotation of the wheel about the shaft, and the grease is changed to change the kinematic shear action resistance to the rotation of the wheel.

2. The variable resistance wheel for a rolling vehicle in accordance with claim 1 wherein the rim comprises two parts that fasten together to form the rim, and each rim part has a first recess, and when the two rim parts are put together the first recess in each rim part cooperate to form a chamber in which the seal is positioned and retained when the two rim parts are fastened together.

3. The variable resistance wheel for a rolling vehicle in accordance with claim 2 wherein the rim parts each have a second recess on the opposite side of the rim part from the first recess, and a bearing is mounted in each of the second recesses, and the shaft on which the wheel is mounted passes through both bearings and the seal.

4. The variable resistance wheel for a rolling vehicle in accordance with claim 3 wherein the material from which the tire is made is selected to pick the rolling resistance of the wheel, and the two rim parts may be disassembled to change the tire to change the rolling resistance of the wheel.

5. The variable resistance wheel for a rolling vehicle in accordance with claim 4 wherein the rim parts each have a lip around their edge furthest from the center hole, and when a first and second rim parts are fastened together to create a rim they create a groove around the periphery of the rim in which the tire is mounted and is retained.

6. The variable resistance wheel for a rolling vehicle in accordance with claim 4 further comprising means for fastening the two rim parts together.

7. The variable resistance wheel for a rolling vehicle in accordance with claim 3 wherein the material from which the tire is made is selected to affect the rolling resistance of the wheel, and the two part rim may be disassembled to change the tire.

8. The variable resistance wheel for a rolling vehicle in accordance with claim 7 wherein the rim parts each have a lip around their edge furthest from the center hole, and when a first and second rim parts are fastened together to create a rim they create a groove around the periphery of the rim in which the tire is mounted and is retained.

9. The variable resistance wheel for a rolling vehicle in accordance with claim 8 further comprising means for fastening the two rim parts together.

10. The variable resistance wheel for a rolling vehicle in accordance with claim 2 wherein the rim parts each have a lip around their edge furthest from the center hole, and when a first and second rim parts are fastened together to create a rim they create a groove around the periphery of the rim in which the tire is mounted and is retained.

11. The variable resistance wheel for a rolling vehicle in accordance with claim 10 further comprising means for fastening the two rim parts together.

12. A variable resistance wheel for a wheeled vehicle, and the vehicle has one or more shafts for mounting variable resistance wheels thereon, wherein the wheel comprises;
   a rim having a hole through its center used for mounting the wheel on a shaft of the vehicle, the rim having at least one bearing that is mounted in the center mounting hole and the at least one bearing assists the rim to rotate on the shaft;
   a tire mounted on the rim;
   a seal mounted in and concentric with the hole through the center of the rim and a shaft passes through the seal and the at least one bearing when the wheel is mounted on the vehicle, wherein the seal presses against the shaft, and wherein the seal has a recess that forms a chamber around the shaft when the seal is pressing against the shaft; and
   a viscous grease that fills the chamber and contacts the shaft;
   wherein the grease creates a kinematic shear action resistance to the rotation of the wheel about the shaft, and the grease is changed to change the kinematic shear action resistance to the rotation of the wheel.

13. The variable resistance wheel for a wheeled vehicle in accordance with claim 12 wherein the rim has a groove around it outer edge in which the tire is positioned and is retained.

* * * * *